Jan. 7, 1930.                    W. G. WILSON                    1,742,626
                        MEANS FOR OPERATING GATE VALVES
                        Filed Sept. 27, 1928        2 Sheets-Sheet 1
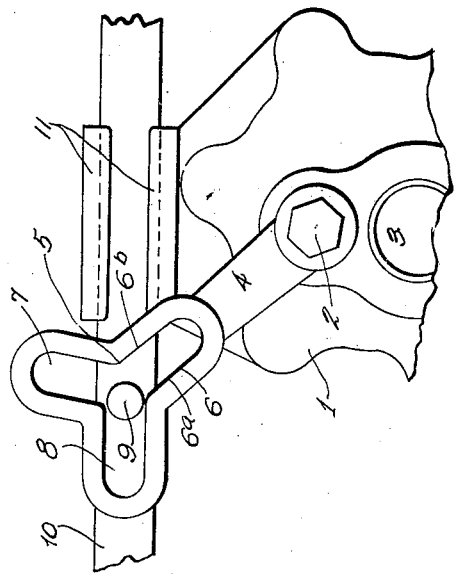
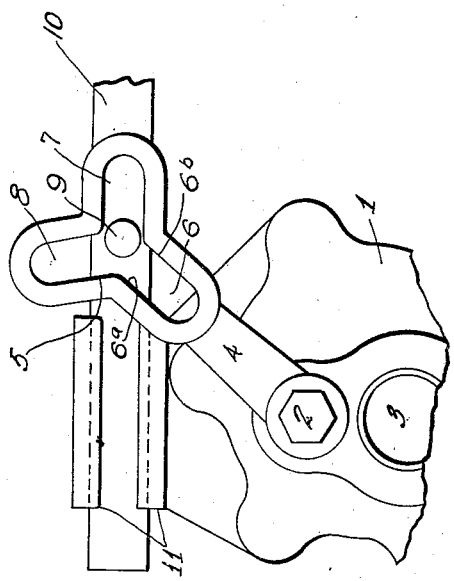
INVENTOR.
Wylie G. Wilson
BY James L. Stewart
    ATTORNEY Jan. 7, 1930.   W. G. WILSON   1,742,626
MEANS FOR OPERATING GATE VALVES
Filed Sept. 27, 1928   2 Sheets-Sheet 2

INVENTOR.
Wylie G. Wilson
BY James L. Stewart
ATTORNEY

Patented Jan. 7, 1930

1,742,626

UNITED STATES PATENT OFFICE

WYLIE G. WILSON, OF JERSEY CITY, NEW JERSEY, ASSIGNOR TO EVERLASTING VALVE COMPANY, A CORPORATION OF NEW JERSEY

MEANS FOR OPERATING GATE VALVES

Application filed September 27, 1928. Serial No. 308,769.

This invention relates to apparatus wherein a power actuated driving element is utilized to transmit power to a driven element in such manner as to drive the driven element through a definite, predetermined distance in opposite directions and to positively lock the driven element at both termini of its travel while allowing of sufficient overtravel of the driving element to permit the latter to expend or dissipate the momentum of itself and associated prime mover, without shock or strain upon the mechanism such as would result from a sudden stopping of these parts.

The present invention is useful for many purposes, but is especially desirable for employment in connection with the operating mechanism of gate valves, such, for example, as disclosed in Patent No. 1,485,002, issued to me on February 26, 1924, and on which construction the present invention constitutes an improvement.

In the operation of a gate valve the sealing element of the valve is moved into and out of registration with the valve port to close or open the valve. When the valve is closed it is of importance that the sealing element be moved into exact registration with the port and thereupon brought to rest in this position. If it overtravels or undertravels, it will fail to properly seal the port and if the overtravel is appreciable, its operating part may strike against the casing with sufficient force to damage the casing or such operating parts of the valve. When the valve is opened, it is necessary to move the sealing element entirely away from the port and then bring it to rest before its operating parts strike the casing. It thus follows that in the operation of a gate valve there are two very definite positions at which the movement of the sealing element should terminate. In other words, if the valve is to function properly and with full efficiency, its sealing element must operate between two well defined and predetermined termini of movement without undertravel or overtravel.

This has long been appreciated, and in order to insure the stopping of the sealing element at these points, it has been the practice to provide stops or abutments so arranged as to positively engage and arrest the operating parts of the valve when the sealing element reaches such predetermined terminal positions. Gate valves, thus constructed, have long been manually operated through suitable operating handles or levers, and as manual operations are fairly elastic and yielding no appreciable difficulty has been experienced. There is, however, an ever increasing demand for the operation of such valves, and particularly valves of the larger sizes, through power produced reciprocating motion derived from hydraulic cylinders, electric motors and the like.

The power operation of gate valves from power produced reciprocating motion presents various problems due to the well recognized fact that it is difficult, if not practically impossible, to operate power machines, such as electric motors and hydraulic cylinders, within definite limits, with a delivery of substantially maximum power up to one of such limits as required in gate valve operation wherein the maximum power required to operate the sealing element is at the extreme end of the closing operation and during the initial movement of the opening operation. The momentum or inertia of the operating parts cannot in practice be instantly dissipated and any attempt to arrest their movement in an instantaneous manner, as for instance with positive stops, results in shocks which are detrimental to the apparatus and which may result in serious damage.

The problem is therefore presented of operating a driven element through a predetermined arc in opposite directions and to stop such driven element in exact predetermined positions without undertravel or overtravel and without necessitating the employment of positive stops or abutments which would occasion detrimental shocks and possible breakage of the valve parts and to accomplish this operation from a source of power producing reciprocating or oscillating motion.

In accordance with the present invention, gears or other toothed elements are dispensed with and a pin and slot connection is utilized in lieu thereof. That is to say, the operating lever of the valve is secured directly to the valve post so that it will be free to rock on said pivotal mounting. It is provided at its outer end with a three-way element of trefoil shape, the same being so formed that three slots are embodied in three distinct arms radiating from a common center. One arm of the slot extends radially of the axis of the operating lever while the other two are formed in equal angular relation to said radius. Into this slot projects a pin carried by a member mounted to reciprocate and driven from a suitable source of power. The reciprocating member is guided for movement along a fixed and predetermined path which is so located with respect to the axis of the valve post and the three-way slot in the operating lever that during an intermediate portion of the reciprocatory movement of the pin, it will travel within the radial arm of the slot and thus serve to move the operating lever through a predetermined arc of operation, at the ends of which arc the pin will leave the radial arm of the slot and enter into one of the non-radial arms thereof. These non-radial arms of the slot are so disposed that they will permit movement of the pin therethrough without imparting any movement to the operating lever, but will, in fact, actually lock the operating lever against any movement whatever while the pin is overtraveling within the confines of one or the other of the non-radial arms of the slot. The reciprocating member with its associated pin is therefore capable of indeterminate movement with considerable overtravel while it serves to positively operate the operating lever of the valve only during that intermediate portion of its stroke necessary to move the sealing element of the valve in opposite directions and to stop such sealing element in exact predetermined positions without overtravel or undertravel of such sealing element. During the overtravel of the reciprocating member, the inertia of such member and its operating parts is dissipated without imparting shocks to the operating lever or the associated sealing element of the valve.

An important feature of the structure to which I have referred is found in the fact that the driving and driven elements are in interlocked relation at all times, so that after the sealing element has been moved into either of its predetermined positions it is locked while the reciprocating element continues to the completion of its stroke; furthermore, the operating lever will be maintained in a position where the radial slot of the three-way slots will be properly positioned to engage the pin carried by the driving element on its return stroke.

It therefore follows that the driving and driven elements in the construction of this invention are at all times susceptible of power-transmitting cooperation and when the prime mover is caused to function there will invariably result the application of force to the valve to open and close the same as the case may be, with a positive locking of the operating lever of the valve at the completion of the driving stroke of the driving element at either terminus thereof.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a side elevation of a valve, the operating mechanism being illustrated in a position wherein the valve is closed.

Figure 2 is a view similar to Figure 1 except that the operating parts are shown in positions corresponding to the open position of the valve.

Figure 4:
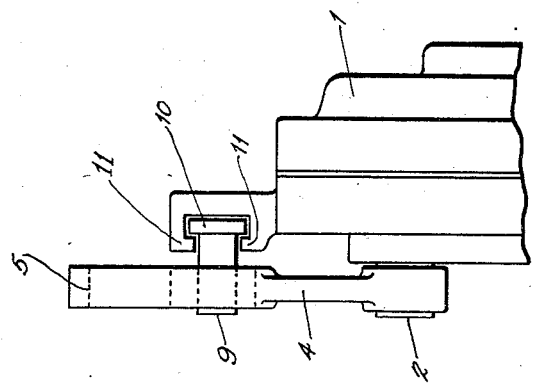
Figure 4 is an edge view of the parts as illustrated in Figure 3.

Referring to the drawings, 1 designates a valve body provided interiorly with a sealing element (not shown) and which sealing element is in practice secured to and operated by a valve shaft 2. Rotation of the shaft 2 in one direction or the other serves to move the sealing element into or out of registration with the port 3 of the valve body for the purpose of closing or opening the valve as may be desired. This structure is conventional and is illustrated merely to show a practical application of the present invention, which, as hereinbefore stated, may be employed for the operation of the sealing element.

It should be borne in mind, however, that with this type of valve, it is desired to move the sealing element from an accurately placed open position to an accurately placed closed position and vice versa. In other words, during the closing movement of the valve, the sealing element must be moved into a position to register with the port and must stop in this position while during the opening of the valve, the sealing element must be moved out of registration with the port and stopped in this position. These open and closed positions which it is desired the sealing element should occupy may be referred to as the termini of movement of the sealing element.

In carrying out the present invention, as illustrated in the drawings, I fix upon the shaft 2 an operating lever 4 and in this lever is formed a three-way slot 5, the three arms of which radiate from a common center and are designated 6, 7, and 8. The arm 6 extends radially with respect to the axis of the valve post 2 while the arms 7 and 8 are non-radial and extend in divergent relation to one another and to the arm 6, as shown.

Extending into the three-way slot 5 is a pin 9. This pin, which constitutes the driving element of the assembly, is of a diameter to form a fairly close sliding fit with the several portions of the slot and is adapted to be operated by power produced reciprocating motion. This motion may be imparted by various mechanisms without departing from this invention. However, as shown, the pin 9 is carried by a rod 10, which is guided for rectilinear reciprocation in suitable guides 11 formed on the valve casing. Movement is imparted to the rod 10 by appropriate connections with an electric motor, hydraulic cylinder or the like.

The relation of the parts must be such that when the sealing element of the valve is in closed position with its sealing element in accurate registration with the port 3, the pin 9 will be disengaged from the radial arm 6 of the slot and will occupy a position within the arm 7. Similarly, when the valve is in open position, with its sealing element out of registration with the port 3, the pin must be disengaged with the radial arm 6 and occupying a position within the arm 8. Furthermore when the sealing element of the valve is in any position intermediate its fully open or fully closed positions, the pin 9 must be positioned within the radial arm 6 of the slot.

It is only when the pin 9 occupies a position within the radial arm 6 that the driving element is capable of imparting movement to the lever 4 which constitutes a driven element of the valve operating mechanism, for it will be apparent that when the pin 9 is traveling in either of the arms 7 or 8 with the sealing element in its corresponding closed and open positions, said latter arms 7 and 8 will extend parallel to the direction of movement of the pin 9 and no movement will be imparted to the operating lever 4.

Figure 3:
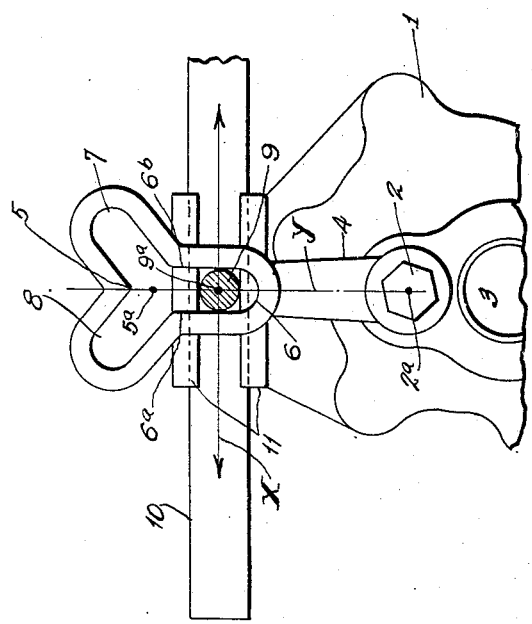
Figure 3 shows the operating parts in midway position.

In order to function in this manner, the relationship between the parts must be substantially as indicated in Figure 3. That is to say, the slot 5 must be substantially Y-shaped and its center $5^a$ must be spaced from the axis $2^a$ of the valve post 2 a distance greater than the distance between the center $9^a$ of pin 9 and the axis 2. Furthermore, the path of travel $x$ of the center $9^a$ of the pin must be perpendicular to the radial arm of the slot when the driven element is in midway position as shown in Fig. 3, wherein the rod 10 is mounted for rectangular reciprocation. Moreover the path of travel $x$ of the pin center $9^a$ must be so spaced from the axis $2^a$ of oscillation of the driven element that the latter will be arrested and locked against movement at the instant it reaches exact "open" or "closed" positions.

A prime mover is employed, the throw or stroke of which is of greater amplitude than is required to move the lever 4 through the arc necessary to shift the sealing element of the valve from fully closed to fully open position or vice versa, and the parts are so associated that the pin 9 will cooperate with the radial arm 6 of the slot during only that intermediate portion of the stroke of the pin as is necessary to move the lever through such arc.

It therefore follows that if the rod 10 is moved from the position shown in Figure 1 to the left, the pin will engage with the left hand edge $6^a$ of the arm 6 and thereafter continued movement of the rod 10 to the left will cause the pin to press against the edge $6^a$ and force the lever 4 to the left past the midway position shown in Figure 3 to substantially the position shown in Figure 2 during which operation the sealing element of the valve will have been moved from fully closed position to fully opened position. When the pin reaches the position of Fig. 2, it will be disengaged from the edge $6^a$ of the arm 6 and immediately enter the arm 8 of the slot. As it enters the arm 8 it will serve to positively lock the lever 4 against any pivotal movement whatsoever for the reason that the arm 8 extends in a direction parallel to the direction of movement of the pin 9.

The operative portion of the stroke of the pin 9 is therefore that portion of the stroke during which the pin 9 moves from the position of Fig. 1 to the position of Fig. 2 and vice versa. Those portions of the stroke beyond this intermediate part to which I have referred are in the nature of overtravel and the arm 8 is of sufficient length to permit of this overtravel without the possibility of the pin 9 contacting with the closed end of such arm.

During this appreciable degree of overtravel of which the pin is susceptible in the direction stated, the inertia of the operating parts, as well as of the prime mover are dissipated and the lever is locked in the position shown in Fig. 2, so that on the intermediate operative portion of the return stroke of the pin 9, the edge $6^b$ of the radial arm 6 lies in the path of the pin 9 as shown in Fig. 2.

It will be apparent by reference to this figure that if the pin 9 continues to move to the right, it will engage with the edge $6^b$ and during the operative intermediate portion of its stroke will drive the lever 4 from the position shown in Fig. 2, back to the position shown in Fig. 1. As soon, however, as the pin reaches the position shown in Fig. 1, it is disengaged from the edge $6^b$ and enters the arm 7 of the slot. This arm is formed in the same manner as the arm 8 and is of like extent, so that during the overtravel of the pin to the right it traverses at least a portion of the length of the arm 7 and during this overtravel the inertia to which I have referred is dissipated or expended. At the same time, the pin 9 will engage with the walls of the arm 7 and in so doing lock the lever in a position to hold the valve sealing element open. Furthermore the fact that the pin upon the completion of its intermediate driving movement in one direction or the other enters immediately into one of the non-radial portions of the slot, results in the locking of the sealing element in either of its predetermined terminal positions and positively precludes any overtravel or undertravel of the sealing element in either direction due to inertia of the operating parts or of the sealing element itself.

The foregoing detailed description sets forth the invention in its preferred practical form, but the invention is to be understood as fully commensurate with the appended claim.

Claim:

In an assembly of the type described, a lever pivotally mounted at one end for rocking movement, and carrying at the other end a trefoil slotted element, one of which slots lies in one radius of the arc which forms the center of movement of the said lever, and the other two slots formed in angular relation to said radius, thus producing three ways radiating from a common center, and bearing to each other an angular relation, in combination with an element mounted for reciprocation to intersect the path of said rocking movement of said lever, said reciprocating element carrying a pin adapted for cooperation with said ways, the elements being so related that during a predetermined sector of said rocking movement of said lever said pin will lie within and engage said way lying within the said radius of said arc, and with the reciprocation of the said reciprocating element and the oscillation of said lever will pass respectively into one or the other of the said associated slots as and when the center of said slots falls into the path of movement of the said reciprocating element.

Signed by me at Jersey City, N. J., this 21st day of September, 1928.

WYLIE G. WILSON.